(12) United States Patent
Chung et al.

(10) Patent No.: US 9,684,299 B2
(45) Date of Patent: Jun. 20, 2017

(54) APPARATUS AND METHOD FOR MANAGING MACHINE TOOL INFORMATION FOR HETEROGENEOUS NUMERICAL CONTROL DEVICES

(71) Applicant: DOOSAN INFRACORE CO., LTD., Incheon (KR)

(72) Inventors: Dae Hyuk Chung, Gyeongsangnam-do (KR); Jang Nam Han, Busan (KR); Jong Tae Kim, Gyeongsangnam-do (KR); Jong Myoung Park, Gyeongsangnam-do (KR); Joo Sik Lee, Gyeongsangnam-do (KR)

(73) Assignee: Doosan Machine Tools Co., Ltd., Gyeongsangnam-do (KR)

( * ) Notice: Subject to any disclaimer, the term of this patent is extended or adjusted under 35 U.S.C. 154(b) by 421 days.

(21) Appl. No.: 14/368,190

(22) PCT Filed: Oct. 18, 2012

(86) PCT No.: PCT/KR2012/008539
§ 371 (c)(1),
(2) Date: Jun. 23, 2014

(87) PCT Pub. No.: WO2013/094868
PCT Pub. Date: Jun. 27, 2013

(65) Prior Publication Data
US 2014/0371898 A1 Dec. 18, 2014

(30) Foreign Application Priority Data

Dec. 23, 2011 (KR) ........................ 10-2011-0141029

(51) Int. Cl.
| | | |
|---|---|---|
| G06F 19/00 | (2011.01) | |
| G05B 19/408 | (2006.01) | |
| G05B 19/409 | (2006.01) | |

(52) U.S. Cl.
CPC ......... G05B 19/408 (2013.01); G05B 19/409 (2013.01); *G05B 2219/31088* (2013.01)

(58) Field of Classification Search
None
See application file for complete search history.

(56) References Cited

U.S. PATENT DOCUMENTS 3,701,113 A * 10/1972 Chace ................. G05B 19/058
700/13
4,115,853 A * 9/1978 Dummermuth ...... G05B 19/056
712/233

(Continued)

FOREIGN PATENT DOCUMENTS

| JP | H07240973 | 9/1995 |
| JP | 2001-042908 | 2/2001 |

(Continued)

OTHER PUBLICATIONS

Dong-Hoon, K. & Jun-Yeob, S. Journal of Mechanical Science and Technology. Jan. 2008, vol. 22, Issue 1, pp. 12-24.*

(Continued)

*Primary Examiner* — Adam Lee
(74) *Attorney, Agent, or Firm* — John D. Veldhuis-Kroeze; Westman, Champlin & Koehler, P.A.

(57) ABSTRACT

The present disclosure relates to a system and a method for managing machine tool information for heterogeneous numerical control devices, and more particularly, to a system and a method for managing machine tool information for heterogeneous numerical control devices which may manage data of heterogeneous numerical control devices by a mobile device through a network, such as a wide area Internet or local WiFi, and monitor an operational state of the machine tool.

5 Claims, 8 Drawing Sheets

(56) References Cited

U.S. PATENT DOCUMENTS

| | | | | |
|---|---|---|---|---|
| 4,882,692 | A * | 11/1989 | Saxton | G06F 17/5086 345/441 |
| 4,912,657 | A * | 3/1990 | Saxton | G06F 3/04845 715/853 |
| 5,291,416 | A * | 3/1994 | Hutchins | G05B 19/4184 700/174 |
| 5,428,715 | A * | 6/1995 | Suzuki | G05B 19/4097 345/419 |
| 5,822,212 | A * | 10/1998 | Tanaka | G05B 19/4063 700/174 |
| 6,437,692 | B1 | 8/2002 | Petite et al. | |
| 6,470,377 | B1 * | 10/2002 | Sevcik | H04L 29/06 700/181 |
| 6,983,422 | B1 * | 1/2006 | Gunther | G05B 19/409 715/768 |
| 7,206,834 | B1 * | 4/2007 | Barth | G05B 19/406 340/3.1 |
| 8,886,924 | B1 * | 11/2014 | Ly | H04L 63/029 713/150 |
| 2001/0056484 | A1 * | 12/2001 | Blumenstock | G06F 11/0748 709/224 |
| 2002/0049512 | A1 * | 4/2002 | Mizuno | G05B 19/41845 700/169 |
| 2002/0188622 | A1 * | 12/2002 | Wallen | G05B 19/4097 |
| 2002/0198964 | A1 | 12/2002 | Fukazawa et al. | |
| 2004/0006401 | A1 | 1/2004 | Yamada et al. | |
| 2004/0107018 | A1 * | 6/2004 | Nakamura | G06T 17/10 700/98 |
| 2004/0222300 | A1 * | 11/2004 | Strickland | G05B 19/042 235/462.15 |
| 2005/0102054 | A1 * | 5/2005 | Dolansky | G05B 19/4069 700/182 |
| 2006/0149412 | A1 * | 7/2006 | Fujishima | G05B 19/4183 700/169 |
| 2007/0005158 | A1 | 1/2007 | Nicolson et al. | |
| 2009/0198370 | A1 * | 8/2009 | Nishi | G05B 19/41815 700/184 |
| 2010/0023156 | A1 * | 1/2010 | Trepina | G05B 19/406 700/175 |

FOREIGN PATENT DOCUMENTS

| | | |
|---|---|---|
| JP | 2004-362411 | 12/2004 |
| KR | 10-0655314 | 12/2006 |

OTHER PUBLICATIONS

European Search Report mailed Jul. 28, 2015 for European Application No. 12859547.7, 6 pages.

Search Report dated Mar. 27, 2013 and written in Korean with English translation for International Patent Application No. PCT/KR2012/008539 filed Oct. 18, 2012, 5 pages.

* cited by examiner

| Data | Type | Parameter | Value |
|---|---|---|---|
| Num_of_Path | INT16 | 9001 | 2 |
| Num_of_Coordinate_System[PATH][ ] | INT16 | MTB_DEFINE | {4, 4} |
| Title_of_Coordinate_System[PATH][ ] | STRING | MTB_DEFINE | {{"ABS", "REL", "MAC", "DIST TO GO"}, {"ABS", "REL", "MAC", "REMAINED"}} |
| Axes_Order[PATH][ ] | INT32 | 1025 | {10230400, 12000000} |
| Axes_Type[PATH] | INT32 | 1025 | {10110200, 11000000} |
| Axes_Name[ ][ ] | STRING | 1029 | {{"X1", "", "Y1", "", "Z1", "", "A", "", ""}, {"X2", "Z2", "", "", "", "", "", "", ""}} |
| Num_of_Time_Data[PATH] | INT16 | MTB_DEFINE | {3, 2} |
| Title_of_Time_Data[PATH][ ] | STRING | MTB_DEFINE | {{"CYCLE TIME", "TMRON", "PWR ON", "", "", ""}, {"CYCLE TIME", "ACCUM. TIME", "", "", "", ""}} |
| Num_of_Part_count | INT16 | 1023 | {3, 0} |
| Title_of_Part_Count[PATH][ ] | STRING | MTB_DEFINE | {{"TODAY", "REQUIRED", "ACCUM."},{""}} |
| Num_of_Spindle | INT16 | 2020 | 2 |
| Spindle_Name[ ] | STRING |  | {"S11", "S12"} |

FIG. 4

ABS

APPARATUS AND METHOD FOR MANAGING MACHINE TOOL INFORMATION FOR HETEROGENEOUS NUMERICAL CONTROL DEVICES

CROSS-REFERENCE TO RELATED APPLICATION

This Application is a Section 371 National Stage Application of International Application No. PCT/KR2012/008539, filed Oct. 18, 2012 and published, not in English, as WO 2013/094868 on Jun. 27, 2013.

FIELD OF THE DISCLOSURE

The present disclosure relates to an apparatus and a method for managing machine tool information for heterogeneous numerical control devices, and more particularly, to an apparatus and a method for managing machine tool information for heterogeneous numerical control devices which may manage data of heterogeneous numerical control devices by a mobile device information unit through a network (for example, a wide area Internet or local WiFi), and monitor an operational state of the machine tool.

BACKGROUND OF THE DISCLOSURE

Monitoring of an operational state of a machine tool located at a remote place through the use of using a computer by a user is recognized as an essential function for management of a large factory possessing a plurality of machine tools, and thus various methods therefor have been developed.

The methods are basically implemented by a server device for collecting data from a machine tool and a client device for confirming information collected from the server device. The machine tool, the server device, and the client device are connected through a wide area network.

In general, a numerical control device (computer numerical control) attached to the machine tool transmits information dependent on a model of a machine tool by using a unique protocol of a manufacturing company of the numerical control device. Accordingly, in order to confirm information about a machine tool by the client device at a remote place, the client device may confirm information about the machine tool only through the unique protocol of the manufacturing company of the numerical control device. Further, a communication program, which is appropriate for information about a model of the machine tool desiring to receive information, needs to be installed in the client device. In the related art, there is a problem in that a communication program appropriate for information about a model of each machine tool needs to be developed.

In order to solve the problem, an intermediate server device is introduced. The intermediate server device may access the numerical control device attached to the machine tool by using various protocols. The intermediate server device provides a function of converting information obtained from the machine tool based on a standard and storing and managing the converted information, so that the client device may be loaded with only a communication function based on a unified protocol through which the standard may be transceived, without a necessity of loading a communication function based on protocols of manufacturing companies of all of the numerical control devices.

However, the method practically requires substantial man power and cost for purchase, maintenance, and the like of the server, so that there is a problem in that it is impossible to apply the method to most factories possessing machines tools.

In order to solve the problem in the related art, there is a need to develop a machine tool alarm message transmission function applicable even to a small factory while focusing on an error point, not an operational state, of the machine tool. There is a suggestion for a method of receiving a machine tool alarm based on the Internet while focusing on recognition of alarm generation, which is the main issue in operating the machine tool.

However, in the method, a user receives an aperiodically generated alarm through a mobile phone, so that there is a problem in that it is impossible to bilaterally exchange information, such as continuous obtainment of information, such as monitoring of an operational state of the machine tool, and transmission of an alarm generation history and a program file, between the mobile device and the machine tool.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

In order to solve the aforementioned problem in the related art, the present disclosure provides an apparatus and a method for managing machine tool information for heterogeneous numerical control devices, which may monitor an operational state of a machine tool and manage data of the machine tool by using a mobile device without separate investment of cost in a small factory possessing machine tools mounted with heterogeneous numerical control devices.

In order to achieve the above object, the present disclosure provides an apparatus for managing machine tool information for heterogeneous numerical control devices, including: a user interface unit configured to display a screen image for manipulation setting and operational states of heterogeneous numerical control devices and receive a manipulation command; a numerical control device information unit configured to store information stored in the heterogeneous numerical control devices and interpretation information necessary to interpret the information stored in the numerical control device for each numerical control device; a mobile device information unit configured to store information about a mobile device, to which the information stored in the numerical control device needs to be transmitted; and a server module configured to interpret information stored in the heterogeneous numerical control devices based on the stored interpretation information, converts a result of the interpretation into information appropriate for the mobile device, and transmit the converted information to the mobile device.

In the meantime, the server module according to the present disclosure includes: a common memory unit configured to communicate with the numerical control device to store information in the numerical control device; a data conversion unit configured to interpret the information stored in the numerical control device stored in the common memory unit based on interpretation information stored in the numerical control device information unit, and convert a result of the interpretation into information appropriate for the mobile device; a data transmission unit configured to transmit the information converted by the data conversion unit to the mobile device; and a command management unit configured to perform a command received from the mobile device.

Further, the present disclosure provides a method for managing machine tool information for heterogeneous numerical control devices, including: storing information in heterogeneous numerical control devices in the common memory unit in which a numerical control device communicates with a server module; reading, by the server module, the information stored in the numerical control devices stored in the common memory unit; interpreting, by the server module, the read information stored in the numerical control devices based on interpretation information; converting a result of the interpretation into information appropriate for the mobile device and transmitting the converted information to the mobile device; and displaying, by the mobile device, the received information.

Accordingly, the apparatus and the method for managing machine tool information for heterogeneous numerical control devices of the present disclosure use a common memory structure in which the numerical control device communicates with the server module, and display interpretation information, based on which information stored in the common memory may be interpreted, in a numerical control device configuration information region, so that there is a remarkable and advantageous effect in management of information of machine tools mounted with the heterogeneous numerical control devices on a network without correcting a server module of the numerical control device and a client module of the mobile device, which is required for communication.

| [Description of Main Reference Numerals of Drawings] Description of Main Reference Numerals of Drawings | |
|---|---|
| 110: Numerical control device | 120: Network relay device |
| 130: Mobile device | 140: Server device |
| 200: Server module | 210: Common memory unit |
| 220: Data conversion unit | 230: Data transmission unit |
| 240: Command management unit | |
| 250: Numerical control device information unit | |
| 260: Mobile device information unit | 270: User interface unit |

DETAILED DESCRIPTION

Terms or words used in the present specification and claims should not be interpreted as being limited to typical or dictionary meanings, but should be interpreted as having meanings and concepts which comply with the technical spirit of the present disclosure, based on the principle that an inventor can appropriately define the concept of the term to describe his/her own disclosure in the best manner.

Therefore, configurations illustrated in the embodiments and the drawings described in the present specification are only the most preferred embodiment of the present disclosure and do not represent all of the technical spirit of the present disclosure, and thus it is to be understood that various equivalents and modified examples, which may replace the configurations, are possible when filing the present application.

Hereinafter, an exemplary embodiment of the present disclosure will be described in detail with reference to the accompanying drawings.

Figure 1:
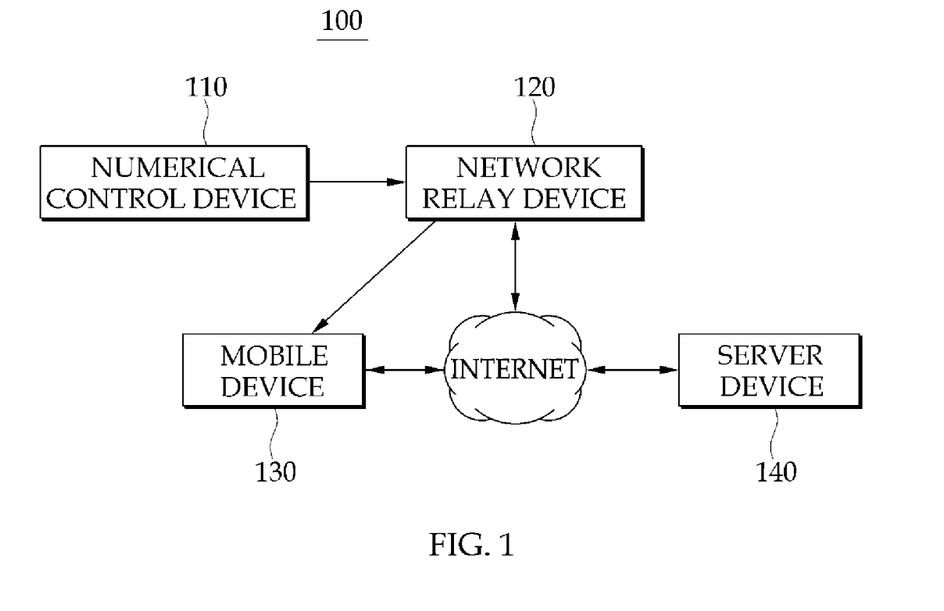
FIG. 1 is a diagram illustrating a system for managing machine tool information according to the present disclosure.

FIG. 1 is a diagram illustrating a system for managing machine tool information according to the present disclosure.

As illustrated in FIG. 1, a system 100 for managing machine tool information of the present disclosure includes a numerical control device 110, a network relay device 120, a mobile device 130, and a server device 140.

That is, the system 100 for managing machine tool information of the present disclosure converts data of a machine tool to data appropriate for the mobile device 130 regardless of the kind of numerical control device 110 and transmits the converted data, and transmits a command directed from the mobile device 130 to the numerical control device 110.

The network relay device 120 transmits information transmitted by a server module of the numerical control device 110 and the server module to the mobile device 130 through the Internet or a local network.

The server device 140 provides a push service function capable of transmitting machine tool alarm information generated by the server module to the mobile device 130 and activating a client module within the mobile device 130.

The mobile device 130 displays the information received from the server module and stores machine tool information.

Figure 2:
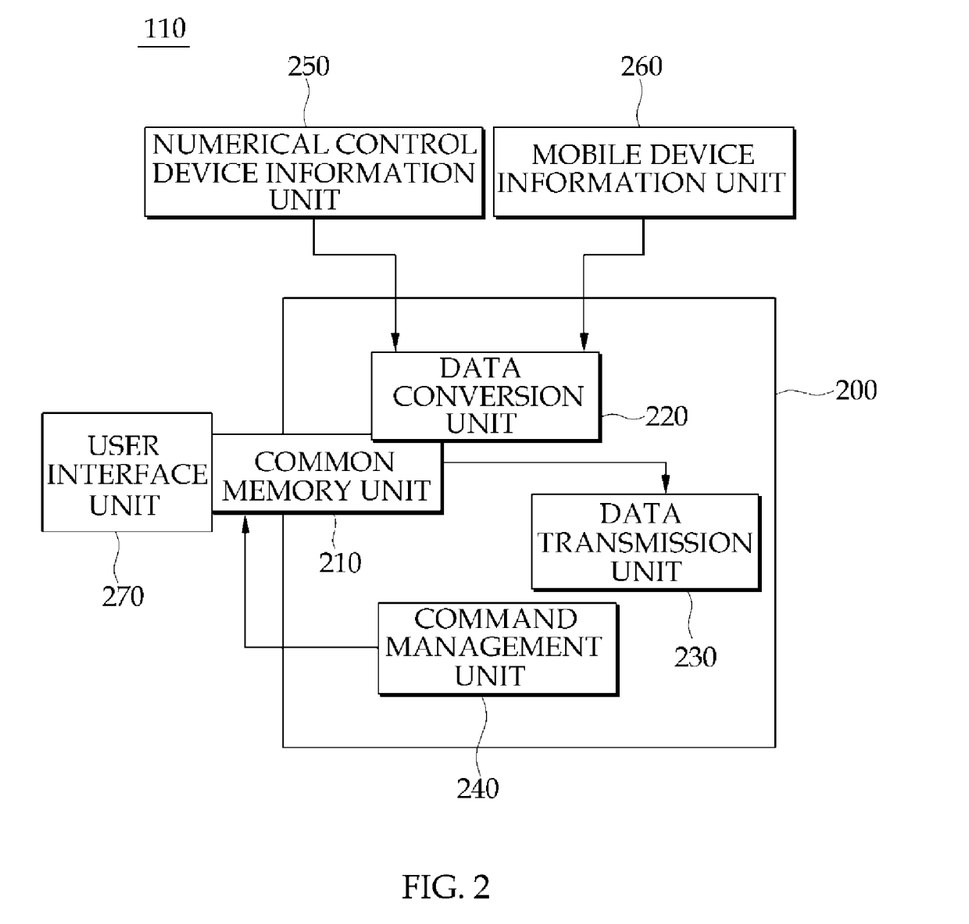
FIG. 2 is a diagram illustrating an apparatus for managing machine tool information for heterogeneous numerical control devices according to the present disclosure.

FIG. 2 is a diagram illustrating an apparatus for managing machine tool information for heterogeneous numerical control devices according to the present disclosure.

As illustrated in FIG. 2, an apparatus for managing machine tool information of the present disclosure includes a server module 200, a numerical control device information unit 250, a mobile device information unit 260, and a user interface unit 270. Further, the server module 200 includes a common memory unit 210, a data conversion unit 220, a data transmission unit 230, and a command management unit 240.

The server module 200 serves to process information on a numerical control device so that a user may identify information appropriate for the accessed numerical control device regardless of the kind of numerical control device, transmit the processed information to a client module of the mobile device 130 through the network, and execute a command directed by the mobile device 130. That is, the server module 200 interprets information stored in the heterogeneous numerical control devices based on stored interpretation information, and converts a result of the interpretation into information appropriate for the mobile device 130 and transmits the converted information to the mobile device 130.

The server module 200 includes a common memory unit 210 for communicating with the numerical control device, a numerical control device information unit 250 storing information based on which information of the common memory unit 210 may be interpreted, a mobile device information unit 260 storing ID information about the mobile device 130 to which the information needs to be transmitted, a data conversion unit 220 interpreting information of the common memory unit 210 based on the numerical control device information unit 250, and converting the interpreted information into information which the mobile device 130 needs to display, a data transmission unit 230 transmitting the converted information to the mobile device 130, and a command management unit 240 performing a command directed by the mobile device 130.

Particularly, the common memory unit 210 stores information in the numerical control device by communicating with the numerical control device 110.

The data conversion unit 220 interprets the information stored in the numerical control device stored in the common memory unit 210 based on interpretation information stored in the numerical control device information unit 250, and converts a result of the interpretation into information appropriate for the mobile device 130.

In the meantime, when the server module 200 receives a download command for one or more of a processing program, alarm generation history information, NC parameter information, tool offset information, and operation offset information from the mobile device 130, the server module 200 transmits information corresponding to the received command to the mobile device 130. Further, when the server module 200 detects that alarm information is generated in the numerical control device 110, the server module 200 transmits the generated alarm information to the mobile device 130 through the push service function of the server device 140.

The mobile device information unit 260 may transmit the alarm information from the numerical control device to the mobile device 130 in a state where the client module of the mobile device 130 at a remote place is not operated. In this case, there is a need for information about the mobile device 130 to which the alarm information and the like is to be transmitted, and unique ID information possessed by the mobile device 130 is stored in the mobile device information unit 260.

The numerical control device information unit 250 stores information stored in heterogeneous numerical control devices and interpretation information necessary to interpret the information stored in the heterogeneous numerical control devices for each numerical control device.

The user interface unit 270 displays a screen image for manipulation setting and an operational state of the machine tool in a graphic form, and receives an operation command from a user.

The mobile device information unit 260 stores information about the mobile device 130 to which the information stored in the heterogeneous numerical control devices is to be transmitted.

Figure 3:
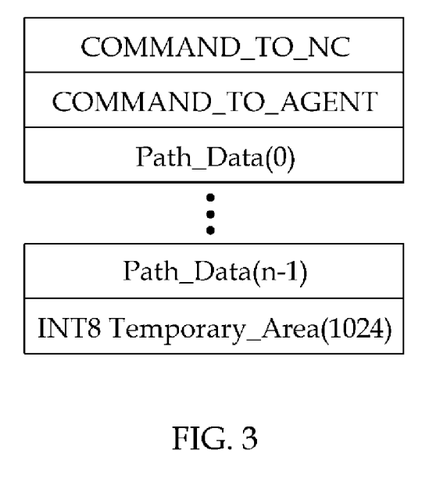
FIG. 3 is a structural diagram illustrating a common memory unit of a server module according to the present disclosure.

FIG. 3 is a structural diagram illustrating the common memory unit of the server module according to the present disclosure.

Referring to FIG. 3, the common memory unit 210 includes a region Path_Data for storing an operational state of the machine tool, a COMMAND_TO_NC region for storing a command for the server module 200 by the numerical control device, a COMMAND_TO_AGENT region for storing a command to be directed to the numerical control device by the server module 200, and a Temporary_Area region for storing information, which needs to be transmitted to the server module 200 by the numerical control device by the command of the server module 200.

The server module 200 may transmit a command for controlling an operation, such as cycle stop, feed hold, and reset, of the machine tool or requesting additional information, such as a version of S/W of the numerical control device and a version of firmware of a servo drive, through the COMMAND_TO_NC region to the numerical control device, and the numerical control device stores the additional information requested from the server module 200 in the Temporary_Area region, and transmits the stored additional information to the server module 200.

Further, the numerical control device may transmit a command directing a change in configuration information about the numerical control device and shut down and the like of the server module 200 to the server module 200 through the COMMAND_TO_AGENT region.

Operational state information about the machine tool includes information on a position of an axis, the directed number of times of rotation and the actual number of times of rotation of a spindle, a load of the spindle, a directed value and an actual value of feed, a unit of feed, an execution time of the machine tool and specific work of the machine tool, the number of parts to be processed or processed, a mode and a state of the numerical control device, a state of the numerical control device, such as a currently executed modal code, a name of a currently executed part program, and block information about a currently executed part program, and the information is updated in real time and stored in the Path_Data region of the common memory unit 210.

Only the numerical value for the state of the machine tool is stored in the Path_Data region, and in order to correctly interpret the numerical value for the state of the machine tool, there is a need for configuration information about the numerical control device. For example, only when there exists information about the number of axes configuring the machine tool, a position of a specific axis indicated by a specific variable value, a name of an axis, it is possible to show information on a position of an axis to the user.

Figure 4:
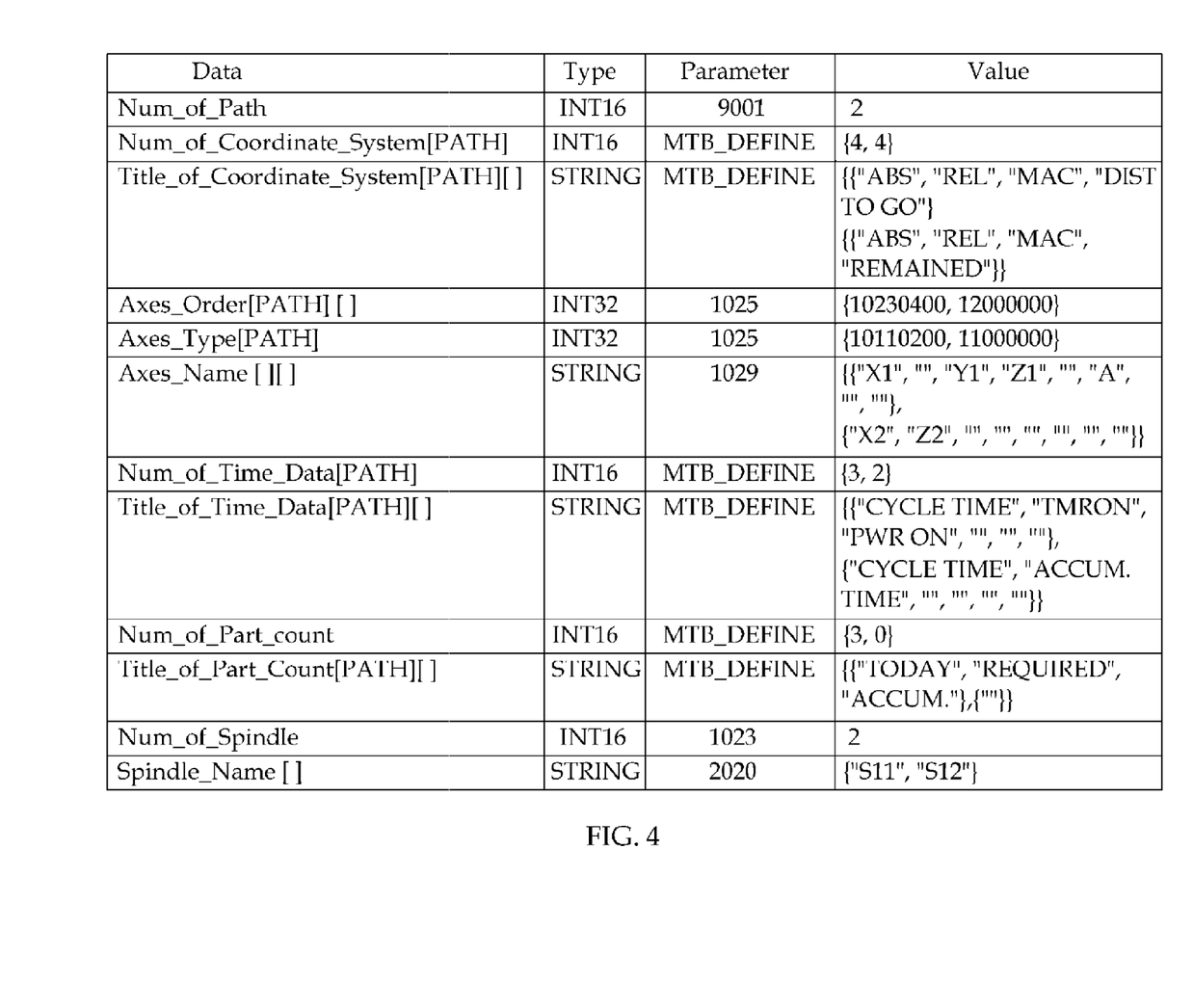
FIG. 4 is a diagram illustrating a numerical control device information unit according to the present disclosure.

FIG. 4 is a diagram illustrating the numerical control device information unit according to the present disclosure.

Referring to FIG. 4, the numerical control device information unit 250 providing information for interpreting the Path_Data of the memory unit 210 includes the number of paths (Num_Of_Path) of the machine tool, the number (Num_of_Coordinate_System) and titles name (Title_of_Coordinate_System) of coordinate systems which are expressible by the numerical control device, position information (Axes_Order) and the type of axis (Axes_Type) indicating whether an axis is used and information on a position of an axis in the common memory unit 210, a name (Axes_Name) assigned to an axis, the number (Num_of- _Time_Data) and a title (Title_of_Time_Data) of pieces of time information which is to be displayed to the user, the number (Num_of_Part_Count) of pieces of processed part count information which is to be displayed to the user, a title (Title_of_Part_Count) of processed part count information, and the number (Num_of_Spindle) and name information (Spindle_Name) of spindles currently used in the machine tool.

The information is pre-defined by a parameter within the numerical control device or an MTB, and a number of a corresponding parameter is written in a Parameter field for information, which needs to be obtained from the parameter of the numerical control device, and a sign MTB_DEFINE is written in a Parameter field for information, which needs to be pre-defined by the MTB.

In interpreting the numerical control device information unit 250, the machine tool includes two paths (the number of part programs which may simultaneously perform), and a first path and a second path equally have four coordinate systems. The coordinate system indicated by the first path has titles of "ABS", "REL", "MAC", and "DIST TO GO", and the coordinate system indicated by the second path has titles of "ABS", "REL", "MAC", and "REMAINED".

Axes of the first path have names X1, Y1, Z1, and A, respectively, and axes of the second path have names X2 and Z2, respectively. Further, axes X1, Y1, Z1, X2, and Y2 are straight axes, and axis A is an axis of rotation.

In the first path, information on three kinds of time CYCLE TIME, TMRON, and PWR ON may be shown to the user, and in the second path, information on two kinds of time CYCLE TIME and ACCUM may be shown.

In regard to the part count information, in the first path, three kinds of count information TODAY, REQUIRED, and ACCUM may be shown to the user, and in the second path, count information is not separately generated.

Finally, two spindles are mounted on the machine tool, and a first spindle has a name of S11, and a second spindle has a name of S12.

Figure 5:
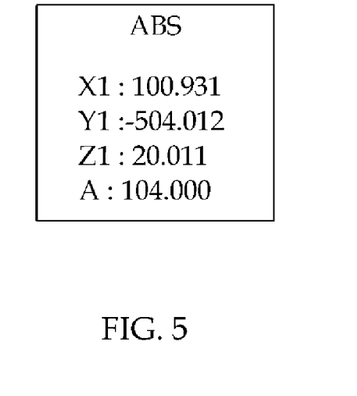
FIG. 5 is a diagram illustrating indication of axis information according to the present disclosure.

Accordingly, values of the first coordinate systems of the first path are represented in FIG. 5.

Figure 6:
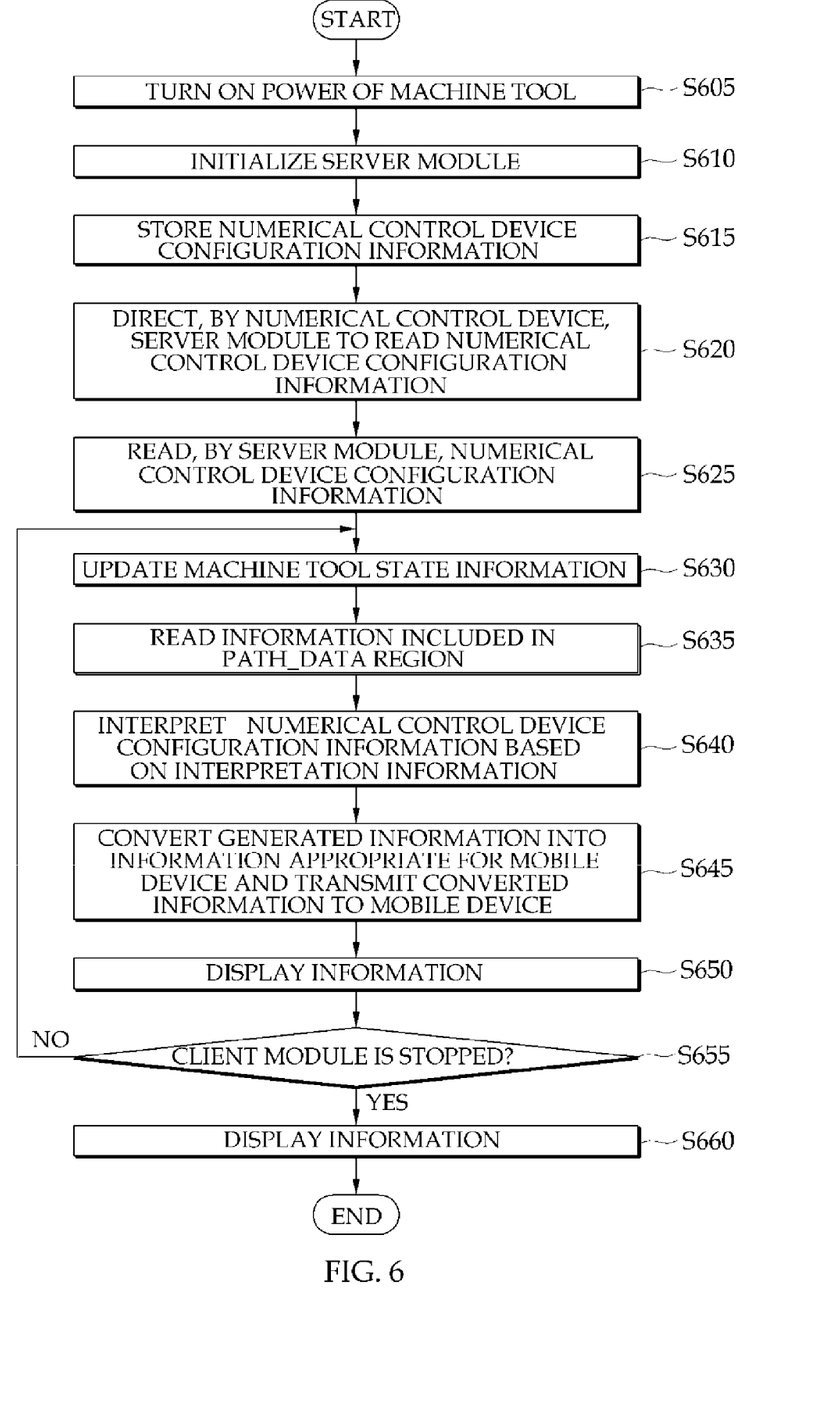
FIG. 6 is a flowchart illustrating a method for controlling a machine tool for heterogeneous numerical control devices according to the present disclosure.

FIG. 6 is a flowchart illustrating a method for controlling a machine tool for heterogeneous numerical control devices according to the present disclosure.

Referring to FIG. 6, when power of the machine tool and the numerical control device is turned on (S605), the numerical control device is operated, and then the server module within the numerical control device is initialized (S610).

Then, information stored in the numerical control device existing within the numerical control device is read, a value of an internal parameter is read for information existing in a parameter of the numerical control device among the information stored in the numerical control device, and the read value of the internal parameter is stored in the numerical control device information unit (S615).

In this case, information having an MTB_DEFINE attribute, not the parameter of the numerical control device is defined by MTB when the machine tool is shipped. Then, the numerical control device notifies the server module of new update of the information stored in the numerical control device and directs the server module to read the information again through the COMMAND_TO_AGENT region of the common memory unit (S620).

The data conversion unit within the server module reads a configuration information update command written in the COMMAND_TO_AGENT region, and reads a numerical control device configuration information file, and stores the read command and file therein (S625).

Then, the numerical control device updates information of the Path_Data region of the common memory unit for every predetermined period (S630), and the information update is continuously repeated until the numerical control device is ended.

The data conversion unit within the server module reads information of the Path_Data region of the common memory unit (S635), and interprets information stored in the numerical control device based on the read information as interpretation information, and generates machine tool execution information, such as information on a position of an axis, information about rotation of the spindle, part count information, and time information (S640).

The data transmission unit converts the generated information into information appropriate for the mobile device 130 through a network relay device and transmits the converted information to the mobile device 130 (S645), and the mobile device 130 receives the transmitted information and shows the received information to the user by the client module (S650).

When the mobile device 130 stops the client module (S655), the server module ceases the transmission of the information (S660), and when the mobile device 130 does not stop the client module, operation S630 is performed.

Figure 7:
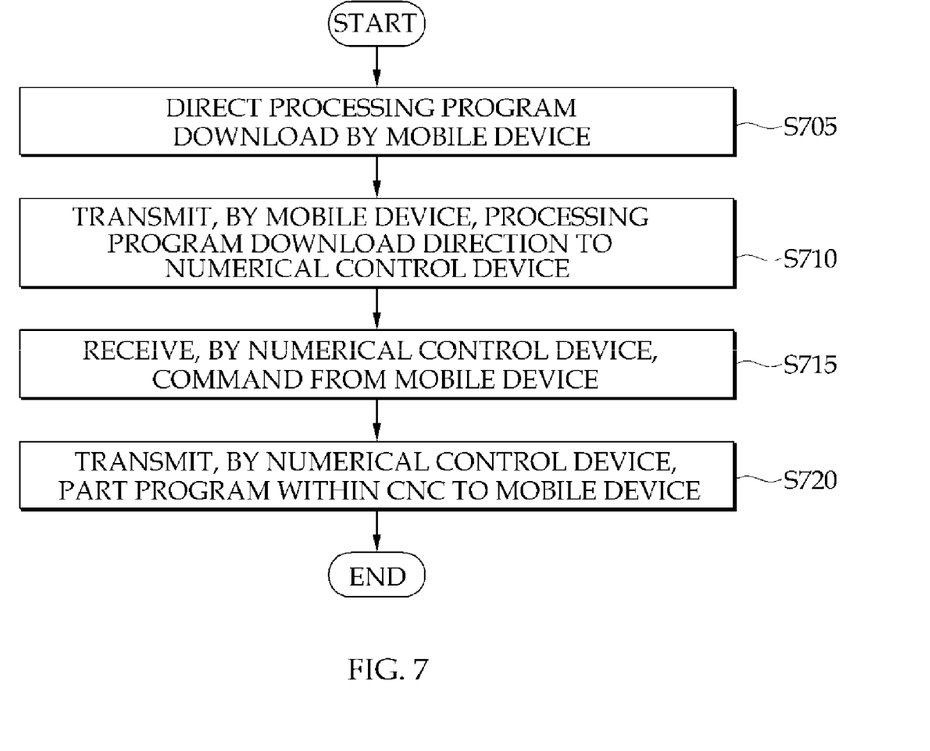
FIG. 7 is a flowchart illustrating a process of performing a command by a mobile device according to an exemplary embodiment of the present disclosure.

FIG. 7 is a flowchart illustrating a process of performing a command of the mobile device according to an exemplary embodiment of the present disclosure.

Specific information on the machine tool may be fetched according to a direction of the mobile device 130, as well as the information on the machine tool may be transmitted to the mobile device 130 from the machine tool. The case where the mobile device 130 desires to receive a processing program file within the numerical control device 110 will be described with reference to FIG. 7.

The mobile device 130 directs the server module 220 to download a processing program through a network (S705).

Then, the mobile device 130 transmits a processing program download command corresponding to the directed command to the server module 200 (S710).

The server module 200 of the numerical control device 110 receives the processing program download command from the mobile device 130, and transmits the received command to the command management unit 240 within the server module 200 (S715).

The command management unit 240 transmits the processing program corresponding to the download direction to the mobile device 130 (S720).

Here, the mobile device 130 may request the server module 200 to transmit information generated by the numerical control device, such as alarm generation history information, NC parameter information, tool offset information, and work offset information, as well as the processing program file, and store/edit/correct the received information therein, and re-transmit the stored/edited/corrected information to the machine tool.

Figure 8:
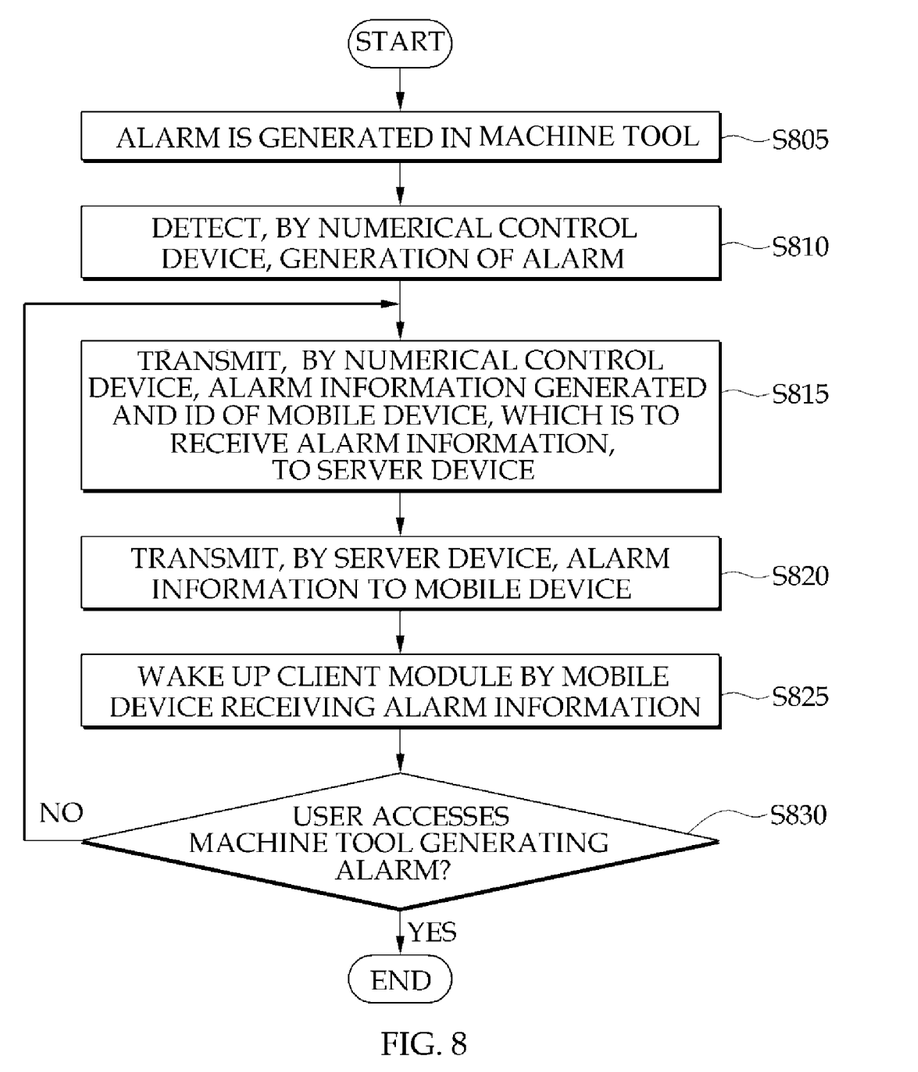
FIG. 8 is a flowchart illustrating a process of transmitting alarm information by using a push service by a server device according to an exemplary embodiment of the present disclosure.

FIG. 8 is a flowchart illustrating a process of transmitting alarm information by using the push service by the server device according to an exemplary embodiment of the present disclosure.

The server module 200 may notify the mobile device 130 of the generation of an alarm by using the push service on the network even while the client module within the mobile device 130 is not operated.

First, when an alarm is generated in the machine tool (S805), alarm information is stored in the Path_Data region within the server module 200.

The server module 200 of the numerical control device 110 detects whether the alarm is generated by recognizing addition/change of the alarm information in the Path_Data region (S810).

Then, the server module 200 transmits the generated alarm information and mobile device information stored in an ID file of the mobile device 130 within the numerical control device 110 to the server device 140. In this case, since the client module within the mobile device 130 is not operated, the alarm information fails to be directly transmitted, and the alarm information and the ID information on the mobile device 130 to be accessed are transmitted to the server device 140 providing the push service on the Internet (S815).

The server device 140 transmits the received alarm message to the mobile device 130 having the received ID (S820), and the mobile device 130 wakes up the client module based on the pushed alarm information (S825).

Through the process, the user recognizes whether the alarm is generated, and operations S815 to S825 are repeatedly performed until the user confirms the generated alarm by accessing the server module 200, and the server module 200 does not transmit the alarm information to the mobile device 130 any longer after the access.

The present disclosure has been illustrated and described based on the exemplary embodiment as discussed above, but the present disclosure is not limited thereto, and may be variously modified and corrected by those skilled in the art without departing from the spirit of the present disclosure.

Although the present disclosure has been described with reference to exemplary and preferred embodiments, workers skilled in the art will recognize that changes may be made in form and detail without departing from the spirit and scope of the disclosure.

The invention claimed is:

1. An apparatus for managing machine tool execution information comprising:
   a machine tool;
   a numerical control device configured to:
      control the machine tool,
      notify a server of an update for the numerical control device, and
      update a numerical value representing a state of the machine tool stored in a common memory unit of a server;
   the server configured to:
      receive, from the numerical control device, a notification of the update for the numerical control device,
      store the updated numerical value and a file for configuring the numerical control device in the common memory unit of the server,
      interpret the numerical control device configuration file based on the updated numerical value,
      generate execution information for the machine tool,
      convert the generated machine tool execution information into information appropriate for display on a mobile device,
      transmit the converted information to the mobile device, and
      perform a command received from the mobile device, wherein received information from the server is displayed by the mobile device, and the command is transferred to the server by the mobile device.

2. The apparatus of claim 1, wherein when the command received by the server is a download command, the server further transmits numerical control device information to the mobile device, wherein the numerical control device information includes one or more of a processing program, alarm generation history information, numerical control (NC) parameter information, tool offset information, and operation offset information.

3. The apparatus of claim 1, wherein when the server detects that alarm information is generated in the numerical control device, the server transmits the generated alarm information to the mobile device through a push service function of the server.

4. The apparatus of claim 1, wherein the numerical control device configuration file includes one or more of a the number of paths (Num Of Path) of the machine tool, the number (Num of Coordinate System) and titles name (Title of Coordinate System) of coordinate systems which are expressible by the numerical control device, position information (Axes Order) and the type of axis (Axes Type) indicating whether an axis is used and information on a position of an axis in the common memory unit, a name (Axes Name) assigned to an axis, the number (Num of Time Data) and a title (Title of Time Data) of pieces of time information which is to be displayed to a user of the mobile device, the number (Num of Part Count) of pieces of processed part count information which is to be displayed to the user on the mobile device, a title (Title of Part Count) of processed part count information, and the number (Num of Spindle) and name information (Spindle Name) of spindles currently used in the machine tool.

5. A method of managing machine tool execution information comprising:
   receiving, by a server, a notification of an update for a numerical control device from the numerical control device;
   storing, by the server, a numerical value representing a state of the machine tool and a file for configuring the numerical control device in a common memory unit of the server;
   updating, by the numerical control device, the numerical value stored in the common memory unit of the server;
   interpreting, by the server, the numerical control device configuration file based on the updated numerical value;
   generating, by the server, execution information for the machine tool;
   converting, by the server, the generated machine tool execution information into information appropriate for display on a mobile device;
   transmitting, by the server, the converted information to the mobile device;
   performing, by the server, a command received by the mobile device, wherein the received information from the server is displayed by the mobile device.

* * * * *